July 27, 1937.  H. W. STERTZBACH ET AL  2,088,142
BRAKE RIGGING FOR RAILWAY CAR TRUCKS
Filed Feb. 1, 1936   3 Sheets-Sheet 1

Inventors
H. W. Stertzbach
AND C. L. Orr
By Seymour & Bright
Attorneys

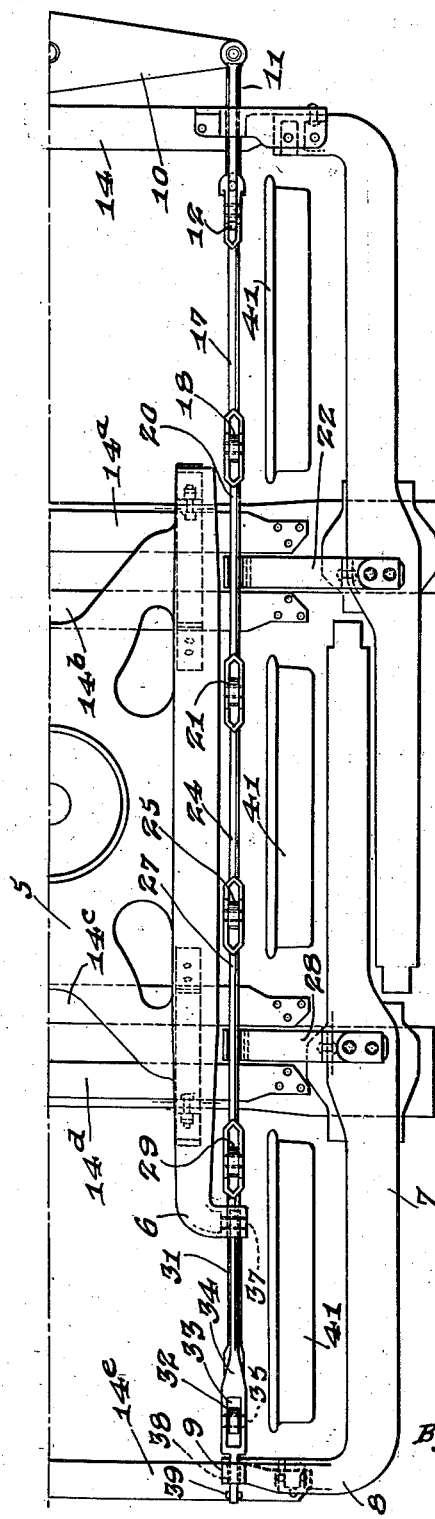

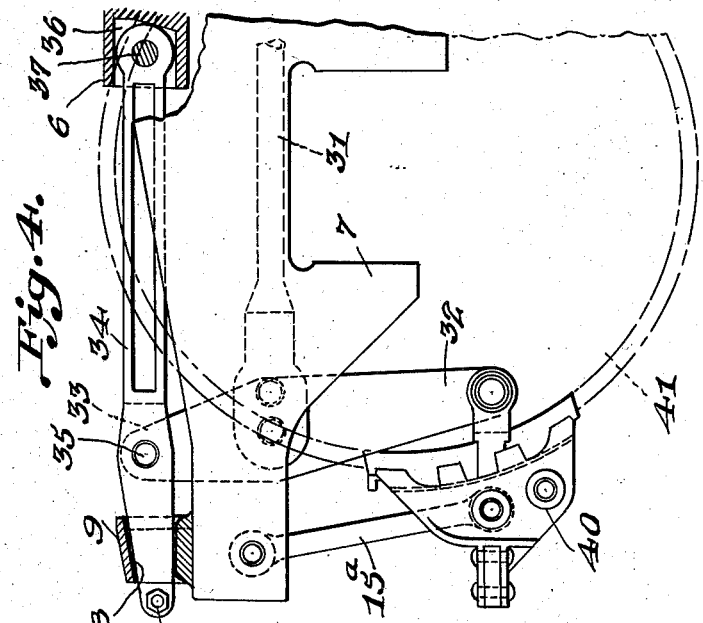
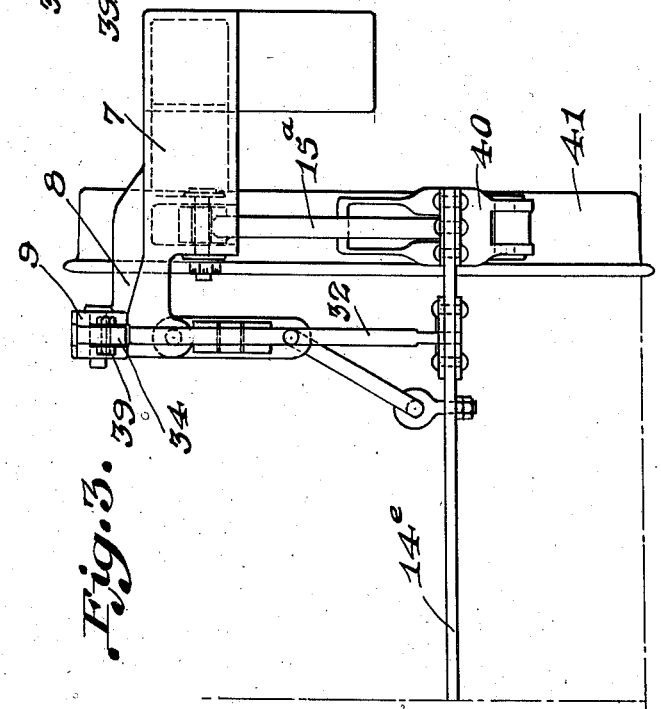

Patented July 27, 1937

2,088,142

UNITED STATES PATENT OFFICE 2,088,142

BRAKE RIGGING FOR RAILWAY CAR TRUCKS

Harry W. Stertzbach and Claude L. Orr, Columbus, Ohio, assignors to The Buckeye Steel Castings Company, Columbus, Ohio Application February 1, 1936, Serial No. 61,992

10 Claims. (Cl. 188—46)

This invention relates to brake rigging for railway cars and more especially to improvements in clasp type brake rigging for six-wheel railway trucks.

Such trucks are used for railway cars and tenders of heavy capacity and necessarily require high braking power, which involves correspondingly great forces for the application of brakes. The well-known Simplex clasp brake is adaptable to a conventional type of six-wheel truck and the operation of this type of brake requires in part a live lever on each side of one end of the truck to which a force outside of the truck is applied, and a dead lever on each side of the truck, usually at the extreme opposite end from the live lever, and which is anchored to the truck. Due to the operation of the brakes, the force exerted on the truck by the dead lever anchor or fulcrum is approximately of the same magnitude as the force exerted on the brakes by the air cylinder on the body of the car or tender. For high capacity cars or tenders with high braking power these forces are of a large magnitude.

Heretofore the dead levers for the above type of brakes and truck have been anchored on the end brake hanger arms of the side frames. This arrangement places an eccentric horizontal force on the side frame and when this force is particularly large, the excessive bending moment makes certain sections of the side frame difficult to design within the required limitations, and furthermore the large eccentric force on the side frame is undesirable for the best operation of the truck.

The principal object of the invention is to relieve the truck side frames of the eccentric horizontal force.

Another object is to anchor the dead lever forces on both sides to the same member of the truck, thereby making the resultant of the two forces concentric with the member to which they are applied.

A still further object is to construct a member of the truck to provide anchors for the dead lever forces which permit the usual operation of the brakes.

Another object is to provide means for carrying the weight of the dead lever and associated brake parts and for transferring the dead lever horizontal force to the truck member.

The above objects are preferably accomplished by means of integral arms extending from the center bolster member of the truck and a fulcrum bar resting at one end on the side frame member, which acts as a guide and vertical support, and which is pinned to the dead lever and center bolster. It is through the pins and fulcrum bar that the horizontal forces are applied to and resisted by the center bolster.

With the foregoing objects outlined and with other objects in view which will appear as the description proceeds, the invention consists in the novel features hereinafter described in detail, illustrated in the accompanying drawings and more particularly pointed out in the appended claims.

In the drawings:

Fig. 2 is a top plan view of one-half of such a truck and braking mechanism with parts omitted to facilitate illustration.

Fig. 3 is a rear elevation also with parts omitted for the sake of illustration.

Fig. 4 is an enlarged view partly in elevation and partly in dot and dash lines and more clearly illustrating the improvements.

Figure 1:
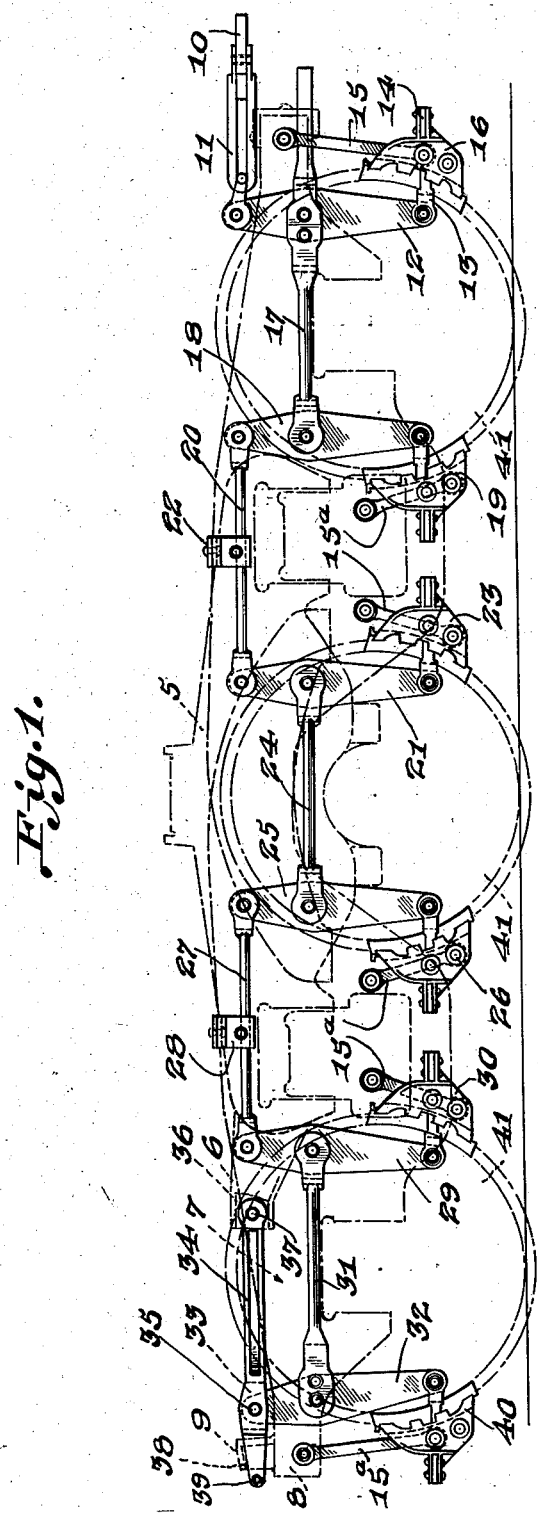
Fig. 1 is a side elevation of a known type of six-wheel truck braking mechanism with our improvements incorporated therein, the brake rigging being shown in full lines and a known type of six-wheel truck being illustrated in dot and dash lines.

Referring to the drawings, 5 is the center bolster member of a six wheel truck, which bolster, for the purposes of the present invention, has an extended arm 6. One of the articulated members 7 of the side frame of this truck has an end brake hanger bracket arm 8 of which the slotted guide member 9 is a part.

Attached to the truck are the brake parts, consisting mainly of a horizontal equalizer lever 10 to which the braking force from the usual air cylinder (not shown) is applied. The ends of the lever, by means of clevises 11, are connected to the upper ends of the vertical levers 12, and the lower ends of these levers are connected by links 13 to one of the end brake beams 14 which is suspended by links 15 from the side frames and carry brake shoes 16.

Horizontal links 17 connect the medial portions of the levers 12 to the medial portions of similar levers 18 that are operatively connected at their lower ends to brake shoes 19. The upper ends of the levers 18 are connected by sliding rods 20 to the upper ends of the next levers 21 and the rods 20 are guided by brackets 22 mounted on the side frames. The levers 21 are operatively connected at their lower ends to brake shoes 23 and are connected at their medial portions by means of horizontal links 24 to the medial portion of the next vertical levers 25. The lower ends of the last-mentioned levers are operatively connected to the brake shoes 26 and at their upper ends to horizontal rods 27 slidably supported by brackets 28 mounted on the side frames. The rods 27 are also connected to the upper ends of vertical levers 29 which are operatively connected at their lower ends to brake shoes 30. Horizontal links 31 connect the medial portions of the levers 29 to the medial portion of vertical levers 32 at the dead end of the brake mechanism and these levers 32 are supported in a novel way in accordance with the present invention. It will be noted that their upper ends extend into slots 33 in horizontal fulcrum bars 34, and horizontal fulcrum pins 35 act to pivotally connect the levers 32 to the bars 34.

As best shown in Fig. 2, each bar 34 is in the same vertical plane as the levers 12, 18, 21, 25, 29 and 32 at a particular side of the truck, and in accordance with this invention one end of each arm 34 extends into a slot 36 in the arm 6 of the center bolster, and a pin 37 is employed in securing this end of the fulcrum bar to the arm 6. The opposite end of the fulcrum bar extends through a slot 38 of the bracket arm 9 of the side frame and is supported by the side frame, and a pin 39 is passed through the extremity of the fulcrum bar to prevent the same from being accidentally disconnected from the side frame.

To facilitate disclosure the brake beams other than the brake beam 14 are designated 14a, 14b, 14c, 14d and 14e, and it will be understood that they are suspended by the conventional links 15a and carry the brake shoes 19, 23, 26, 30 and 40.

Of course, the truck is provided with conventional wheels 41 to be clasped by the brake shoes 16, 19, 23, 26, 30 and 40.

In the type of brakes described above, the brake force from the equalizer lever 10 is transmitted from one vertical lever to another on each side of the truck through the pull rods or links 17, 20, 24, 27 and 31, and in this type of truck it is essential to provide a fulcrum for the dead end vertical lever 32. Heretofore this fulcrum was provided on the arm 8 of the side frame and as mentioned above such arrangement applied an eccentric horizontal force of large magnitude on the side frame. The side frames are relieved of this force in accordance with our novel construction, for when the brake force is applied, the fulcrum bars 34 are subjected to compression. The compressive force is resisted by the pins 37 through the center bolster arms 6 which are spaced symmetrically about the longitudinal center line of the truck and therefore the resultant force is on the center line of the center bolster. Of course, the arm 6 at each side of the truck is constructed and arranged so as to position the fulcrum bar in line with the brake pull rods thereby avoiding any lateral components of the compressive force and permitting the free operation of the vertical lever adjacent to the arm as it travels longitudinally of the truck when the brakes are applied or released.

From the foregoing it is believed that the construction, operation and advantages of the invention may be readily understood. Furthermore many modifications of the invention will be apparent to those familiar with such structures without departing therefrom or from the scope of the claims, and since the foregoing disclosure has been given by way of example for clearness and understanding, no unnecessary limitations should be understood and the appended claims should be construed as broadly as the state of the art permits.

What is claimed and desired to be secured by Letters Patent is:

1. In a railway car truck, a wheel-supported center bolster having a projecting arm, a side frame having a projecting arm, a fulcrum bar connected to the arms of the center bolster and side frame, a lever supported by the fulcrum bar, a brake shoe engageable with one of the wheels of the truck, and means operatively connecting the lever to said brake shoe.

2. In a wheel-supported railway car truck, a center bolster having a projecting arm, a side frame having a projecting arm, a fulcrum bar having its end portions secured to the arms of the center bolster and side frame, a lever pivotally suspended from the fulcrum bar, a brake shoe cooperating with one of said wheels and operatively connected to said lever, and means for swinging said lever and for moving the brake shoe into and out of engagement with the last-mentioned wheel.

3. In a wheel-supported car truck, a center bolster having a projecting arm provided with a slot, a side frame having a projecting arm, a fulcrum bar operatively connected to the arm of the side frame and extending into the slot in the arm of the center bolster, means for securing the slotted portion of the arm of the center bolster to the fulcrum bar, a lever pivotally suspended from said bar, a brake shoe engageable with one of said wheels and operatively connected to said lever, and means for actuating said lever.

4. In a wheel-supported railway car truck, a side frame having a slotted portion, a center bolster having a projecting arm, a fulcrum bar secured to the arm of the center bolster and having one of its ends secured to the slotted portion of the side frame, a lever pivotally suspended from the fulcrum bar, a brake shoe operatively connected to the lever and engageable with one of the wheels of the truck, and means for actuating said lever.

5. In a wheel-supported railway car truck, a center bolster having a projecting arm, a side frame having a projecting arm, a substantially horizontal fulcrum bar having its end portion secured to the arms of the center bolster and side frame, a lever pivotally suspended from the medial portion of the fulcrum bar, a brake shoe operatively connected to said lever and engageable with one of said wheels, and means for actuating said lever.

6. In a six-wheel car truck, a center bolster having a projecting arm, a side frame having a projecting arm, brake shoes cooperating with the wheels, a series of substantially vertically arranged levers operatively connected to said shoes, a series of substantially horizontal pull rods operatively connecting the levers for applying the shoes to the wheels, a fulcrum bar having its ends connected to the arms of the center bolster and side frame, one of said levers being pivotally suspended from the medial portion of said fulcrum bar.

7. In a six-wheel car truck, a center bolster having a projecting arm, a side frame having a projecting arm, brake shoes cooperating with the wheels, a series of substantially vertically arranged levers operatively connected to said shoes, a series of substantially horizontal pull rods operatively connecting the levers for applying the shoes to the wheels, a fulcrum bar having its ends connected to the arms of the center bolster and side frame, one of said levers being pivotally suspended from the medial portion of said fulcrum bar, all of said levers, pull rods and fulcrum bar being arranged in substantially the same vertical plane.

8. In a six-wheel car truck, a center bolster having a projecting arm, a side frame having a projecting arm, brake shoes cooperating with the wheels, a series of substantially vertically arranged levers operatively connected to said shoes, a series of substantially horizontal pull rods operatively connecting the levers for applying the shoes to the wheels, a fulcrum bar having its ends connected to the arms of the center bolster and side frame, one of said levers being pivotally suspended from the medial portion of said fulcrum bar, and an equalizer lever connected to the substantially vertical levers at the end of the truck opposite to that where the fulcrum bars are positioned.

9. In a six-wheel car truck a center bolster having a projecting arm, a side frame having a projecting arm, brake beams suspended from the truck, brake shoes carried by the beams and engageable with the wheels, substantially vertical levers having their lower ends operatively connected to the beams, an equalizer lever pivotally connected to the upper end of one of said vertical levers at one end of the truck, a fulcrum bar arranged at the opposite end of the truck and having one of its ends secured to the projecting arm of the side frame and its other end secured to the projecting arm of the center bolster, the vertical lever at the last-mentioned end of the truck being pivotally suspended from said fulcrum bar, and pull rods operatively connecting said vertical levers.

10. In a six-wheel car truck a center bolster having a projecting arm, a side frame having a projecting arm, brake beams suspended from the truck, brake shoes carried by the beams and engageable with the wheels, substantially vertical levers having their lower ends operatively connected to the beams, an equalizer lever pivotally connected to the upper end of one of said vertical levers at one end of the truck, a fulcrum bar arranged at the opposite end of the truck and having one of its ends secured to the projecting arm of the side frame and its other end secured to the projecting arm of the center bolster, the vertical lever at the last-mentioned end of the truck being pivotally suspended from said fulcrum bar, and pull rods operatively connecting said vertical levers, said pull rods, vertical levers and fulcrum bar being arranged in substantially the same vertical plane.

HARRY W. STERTZBACH.
CLAUDE L. ORR.